US012659805B2

(12) United States Patent
Huang et al.

(10) Patent No.: US 12,659,805 B2
(45) Date of Patent: Jun. 16, 2026

(54) SYSTEMS AND METHODS FOR NETWORK-BASED DETECTION OF IDLE DEDICATED BEARER RESOURCES

(71) Applicant: Verizon Patent and Licensing Inc., Basking Ridge, NJ (US)

(72) Inventors: Ye Huang, San Ramon, CA (US); Lixia Yan, Basking Ridge, NJ (US); Sudhakar Reddy Patil, Flower Mound, TX (US); Jin Yang, Orinda, CA (US); Michael R. Waters, Staten Island, NY (US); Yousef Abdelmalek, New Providence, NJ (US); Jerry Steben, Fort Worth, TX (US); Raquel Morera Sempere, Weehawken, NJ (US); Emerando M. Delos Reyes, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 829 days.

(21) Appl. No.: 17/931,996

(22) Filed: Sep. 14, 2022

(65) Prior Publication Data

US 2024/0089797 A1 Mar. 14, 2024

(51) Int. Cl.
*H04W 28/16* (2009.01)
*H04W 28/02* (2009.01)
*H04W 76/36* (2018.01)

(52) U.S. Cl.
CPC ....... *H04W 28/16* (2013.01); *H04W 28/0268* (2013.01); *H04W 76/36* (2018.02)

(58) Field of Classification Search
CPC . H04W 28/02; H04W 28/0268; H04W 28/16; H04W 76/36
See application file for complete search history.

(56) References Cited

U.S. PATENT DOCUMENTS

2015/0312950 A1* 10/2015 Cartmell ............... H04W 76/38
370/329
2020/0178113 A1* 6/2020 Jin ......................... H04W 76/11
2023/0075589 A1* 3/2023 Zhang ................... H04W 24/04

FOREIGN PATENT DOCUMENTS

WO WO-2012153211 A1 * 11/2012 ...... H04W 36/00837

* cited by examiner

*Primary Examiner* — Jinsong Hu
*Assistant Examiner* — Farideh Madani

(57) ABSTRACT

A first network device may receive, from an application server, a first request for a dedicated bearer session for an application with a quality of service (QoS) and for a notification of an idle session for the application. The first network device may generate, based on the first request, a second request to be notified regarding expiration of an idle session timer for the application, and may provide the second request to a second network device. The first network device may receive, from the second network device and based on the second request, a notification of expiration of the idle session timer for the application, and may provide, to the application server, the notification of expiration of the idle session timer for the application.

20 Claims, 9 Drawing Sheets

100

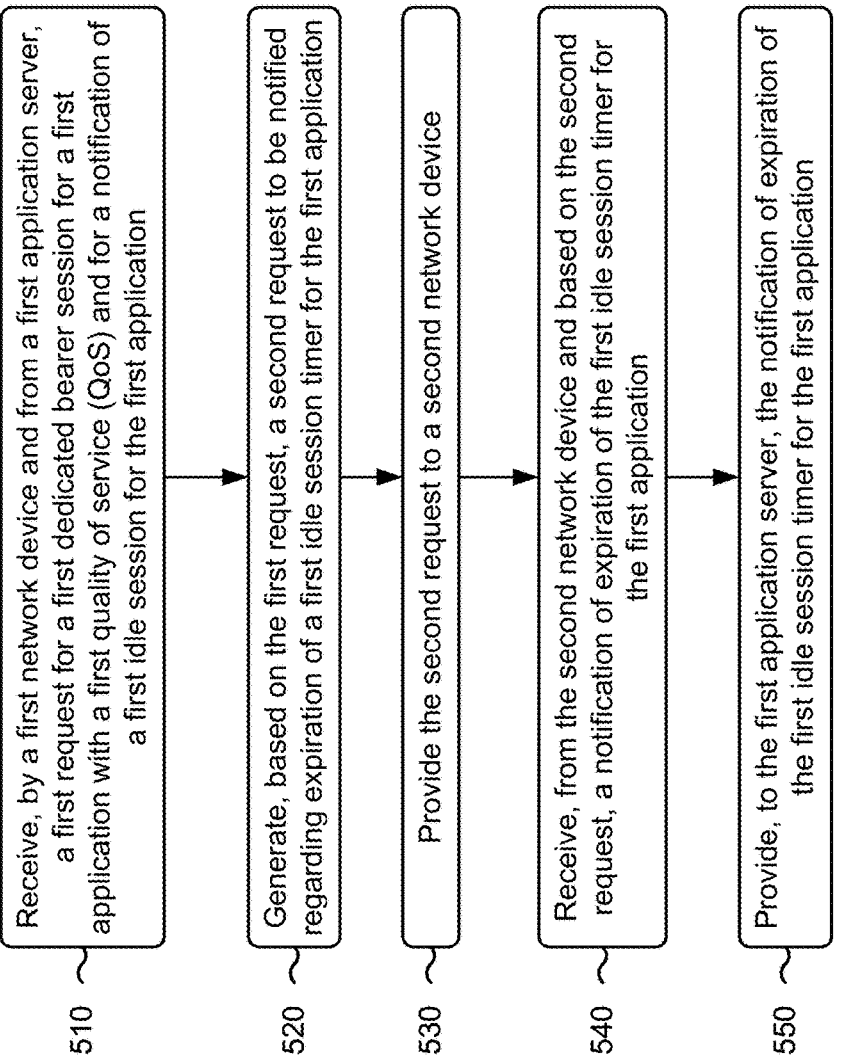

510 — Receive, by a first network device and from a first application server, a first request for a first dedicated bearer session for a first application with a first quality of service (QoS) and for a notification of a first idle session for the first application 520 — Generate, based on the first request, a second request to be notified regarding expiration of a first idle session timer for the first application 530 — Provide the second request to a second network device 540 — Receive, from the second network device and based on the second request, a notification of expiration of the first idle session timer for the first application 550 — Provide, to the first application server, the notification of expiration of the first idle session timer for the first application

SYSTEMS AND METHODS FOR NETWORK-BASED DETECTION OF IDLE DEDICATED BEARER RESOURCES

BACKGROUND

A user device may access, via a cellular network, such as a fourth generation (4G) network or a fifth generation (5G) network, an application requiring an elevated quality of service (QoS) (e.g., low latency and high throughput).

BRIEF DESCRIPTION OF THE DRAWINGS

FIG. 5 is a flowchart of an example process for network-based detection of idle dedicated bearer resources.

DETAILED DESCRIPTION OF EXAMPLE EMBODIMENTS

Figure 1A:
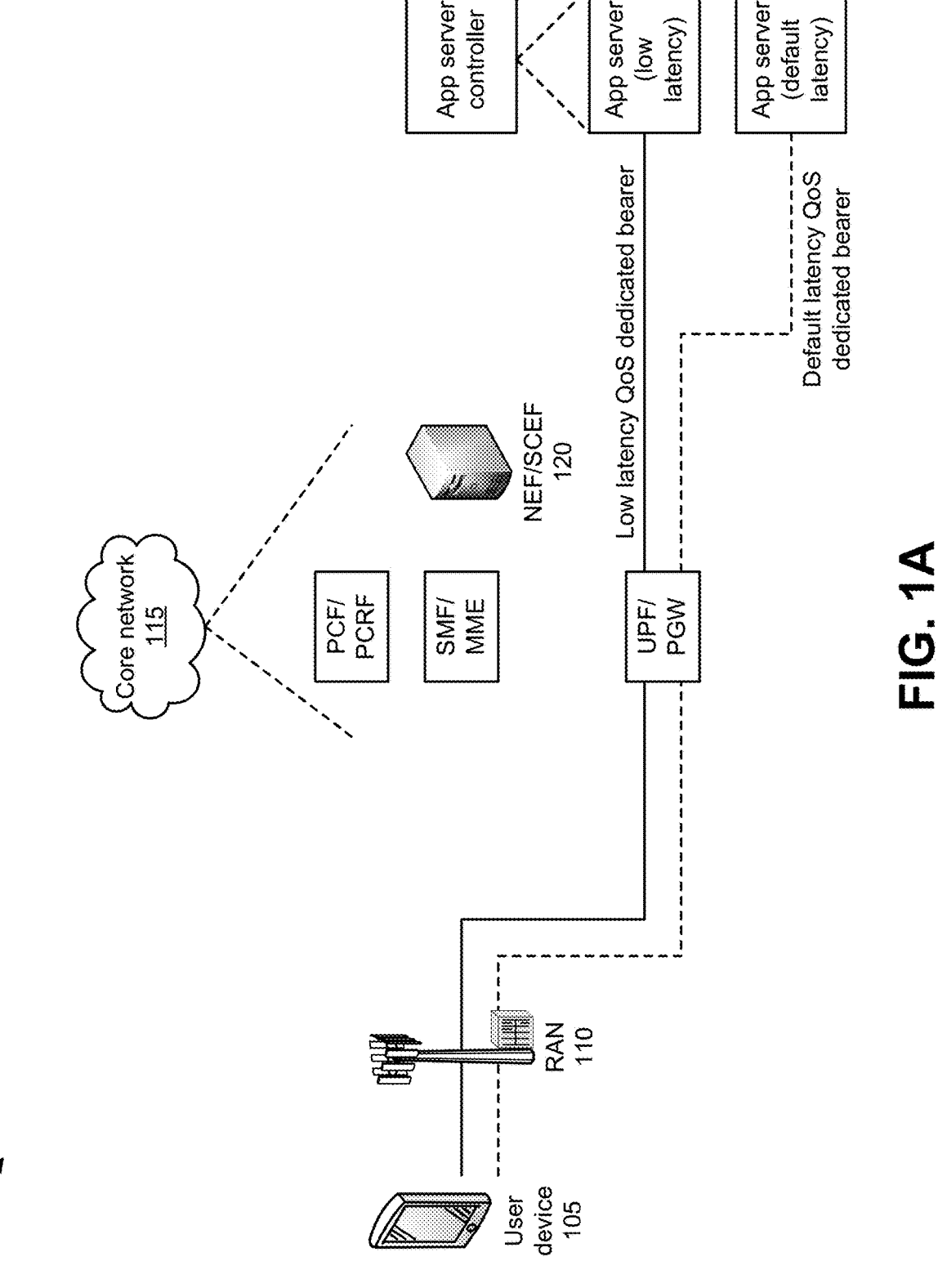
FIGS. 1A-1E are diagrams of an example associated with network-based detection of idle dedicated bearer resources.

The following detailed description of example implementations refers to the accompanying drawings. The same reference numbers in different drawings may identify the same or similar elements.

More applications accessed by user devices are requiring use of an on-demand QoS application programming interface (API) service to create an elevated QoS session with dedicated bearer resources. For example, such applications may require low latency and high throughput (e.g., with QoS class identifiers of "80," "83," and/or the like) resources that are in high demand and with limited availability. However, when a low latency application is idle or inactive for an extended time period, dedicated bearer resources of the application are unable to be released (e.g., and made available for other user devices) since there is no mechanism to release the dedicated bearer resources based on idleness or inactivity. Current protocol data unit (PDU)/packet data network (PDN) idle session timers fail to cause dedicated bearer resources to be released since normal traffic keeps the dedicated bearer resources active long enough to prevent expiration of the idle session timers. Furthermore, the PDU/PDN idle session timers include considerable time periods (e.g., two hours), and there is no mechanism to provide a dedicated bearer idle session timer from an application to a network device.

Thus, current mechanisms for preventing an application (e.g., a low latency application) from being idle or inactive for an extended period of time and consuming computing resources (e.g., processing resources, memory resources, communication resources, and/or the like), networking resources, and/or other resources associated with utilizing dedicated bearer resources for an idle or inactive application, failing to identify the idle or inactive application (e.g., a low latency application), failing to provide dedicated bearer resources for other applications (e.g., other low latency applications), creating network congestion due to utilizing dedicated bearer resources for the idle or inactive application, and/or the like.

Some implementations described herein provide a first network device (e.g., a network exposure function (NEF) in 5G networks or a service capabilities exposure function (SCEF) in 4G networks) that provides network-based detection of idle dedicated bearer resources. For example, the first network device may receive, from an application server, a first request for a dedicated bearer session for an application with a QoS and for a notification of an idle session for the application. The first network device may generate, based on the first request, a second request to be notified regarding expiration of an idle session timer for the application, and may provide the second request to a second network device. The first network device may receive, from the second network device and based on the second request, a notification of expiration of the idle session timer for the application, and may provide, to the application server, the notification of expiration of the idle session timer for the application.

In this way, the NEF/SCEF provides network-based detection of idle dedicated bearer resources. For example, the NEF/SCEF may monitor activity associated with an application, and may determine whether the application is idle based on monitoring the activity associated with the application. The NEF/SCEF may cause the dedicated bearer resources associated with the application to be released based on determining that the application has been idle for a predetermined period of time. Thus, the NEF/SCEF may conserve computing resources, networking resources, and/or other resources that would otherwise have been consumed by utilizing dedicated bearer resources for an idle or inactive application, failing to identify the idle or inactive application, failing to provide dedicated bearer resources for other applications, creating network congestion due to utilizing dedicated bearer resources for the idle or inactive application, and/or the like.

FIGS. 1A-IE are diagrams of an example 100 associated with network-based detection of idle dedicated bearer resources. As shown in FIGS. 1A-1E, example 100 includes a user device 105, a radio access network (RAN) 110, a core network 115, an application server controller, and application servers. The core network 115 may include an NEF/SCEF 120 (sometimes referred to as an SCEF 120 or an NEF 120), a policy control function (PCF) or a policy and charging rules function (PCRF), a session management function (SMF) or a mobility management entity (MME), and a user plane function (UPF) or a packet data network gateway (PGW). Further details of the user device 105, the RAN 110, the core network 115, the NEF/SCEF 120, the application server controller, the application servers, the PCRF/PCF, the SMF/MIE, and the UPF/PGW are provided elsewhere herein. Although only a single user device 105 and RAN 110 are depicted in FIG. 1A, in some implementations multiple user devices 105 and RANs 110 may be associated with the core network 115. Although implementations are described in connection with a low latency application, the implementations may be utilized with other types of applications other than low latency applications.

As further shown in FIG. 1A, the user device 105 may utilize the RAN 110 to establish a protocol data unit (PDU) session with the UPF/PGW so that the user device 105 may access the application servers. The user device 105 may establish a low latency QoS dedicated bearer session with a low latency application (e.g., a gaming application provided by one of the application servers) via the PDU session. The user device 105 may also establish a default latency QoS dedicated bearer session with a default latency application (e.g., an Internet browser provided by one of the application servers) via the PDU session. The default latency may be greater than the low latency. When the low latency application is idle or inactive for an extended time period, dedicated bearer resources of the low latency application (e.g., which may be scarce) need to be released and made available for other user devices 105.

Figure 1B:
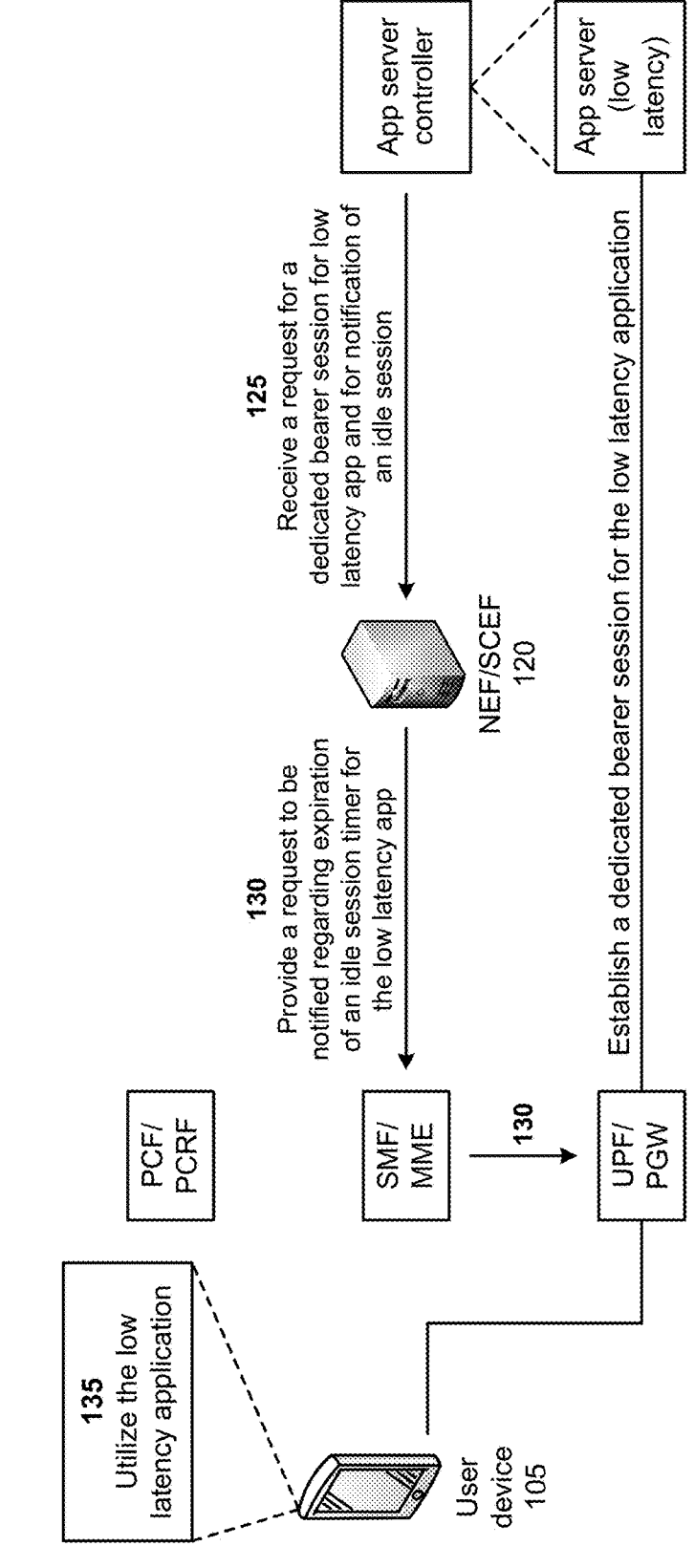

As shown in FIG. 1B, and by reference number 125, the NEF/SCEF 120 may receive a request for a dedicated bearer session for an application (e.g., a low latency application) with a QoS that guarantees low latency for the application) and for a notification of an idle session for the application. For example, when the user device 105 attempts to establish a dedicated bearer session with the application server (e.g., for accessing the low latency application), the low latency application server may generate the request for the dedicated bearer session for the low latency application. The request for the dedicated bearer session may also include a subscription request for the notification of the idle session for the low latency application. The low latency application may provide the request for the dedicated bearer session for the low latency application and for the notification of the idle session for the low latency application to the NEF/SCEF 120, and the NEF/SCEF 120 may receive the request for the dedicated bearer session for the low latency application and for the notification of the idle session for the low latency application.

As further shown in FIG. 1B, and by reference number 130, the NEF/SCEF 120 may provide a request to be notified regarding expiration of an idle session timer for the low latency application. For example, the NEF/SCEF 120 may provide the request to be notified regarding expiration of the idle session timer for the low latency application to the SMF/MME, and the SMF/MIE may provide the request to be notified regarding expiration of the idle session timer for the low latency application to the UPF/PGW. In some implementations, the request may include a control flag indicating (e.g., if set) that the NEF/SCEF 120 is to be notified regarding expiration of the idle session timer for the low latency application. In some implementations, the request may include the request for the dedicated bearer session for the low latency application.

The UPF/PGW may receive the request to be notified regarding expiration of the idle session timer for the low latency application (e.g., which includes the request for the dedicated bearer session for the low latency application), and may establish a PDU session with the user device 105, via the RAN 110, so that the user device 105 may access the low latency application server. As further shown in FIG. 1B, the UPF/PGW may establish a low latency QoS dedicated bearer session between the user device 105 and the low latency application server, via the PDU session.

As further shown in FIG. 1B, and by reference number 135, the user device 105 may utilize the low latency application. For example, the user device 105 may utilize the low latency application (e.g., provided by the low latency application server) via the low latency QoS dedicated bearer session established between the user device 105 and the low latency application server. In some implementations, the user device 105 may utilize the low latency application for a brief time period (e.g., in seconds or minutes) after establishment of the low latency QoS dedicated bearer session, a longer time period (e.g., in minutes or hours) after establishment of the low latency QoS dedicated bearer session, and/or the like.

Figure 1C:
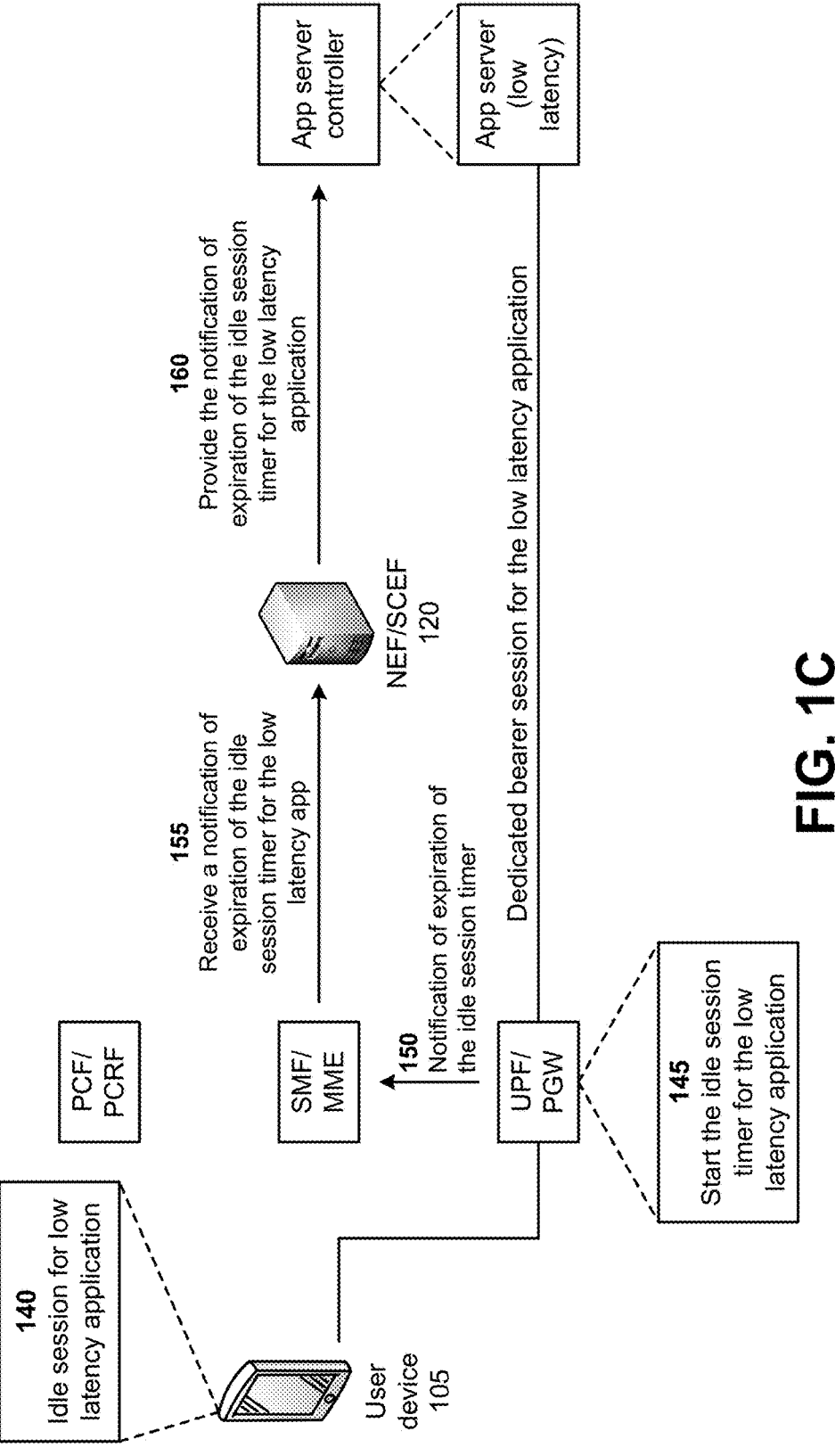

As shown in FIG. 1C, and by reference number 140, the user device 105 may cease utilizing the low latency application to create an idle session for the low latency application. For example, the user device 105 may cease utilizing the low latency application immediately after establishment of the low latency QoS dedicated bearer session, a time period after establishment of the low latency QoS dedicated bearer session, and/or the like. For example, if the low latency application is an online game, a user of the user device 105 may play the online game for an hour and may then take a break from playing the online game but without exiting the online game. In such an example, the online game may create the idle session for the low latency application that is unnecessarily utilizing network resources.

As further shown in FIG. 1C, and by reference number 145, the UPF/PGW may start the idle session timer for the low latency application. For example, the UPF/PGW may start the idle session timer for the low latency application when the user device 105 ceases utilizing the low latency application and creates the idle session for the low latency application. The idle session timer may continue until the user device 105 utilizes the low latency application again or until the idle session timer expires. The idle session timer may include a timer set for a predetermined time period (e.g., in minutes and less than one hour).

As further shown in FIG. 1C, and by reference number 150, the UPF/PGW may provide a notification of expiration of the idle session timer to the SMF/MME. For example, if the user device 105 creates the idle session for the low latency application and fails to utilize the low latency application, the idle session timer may expire. When the idle session timer expires, the UPF/PGW may generate the notification of expiration of the idle session timer, and may provide the notification of expiration of the idle session timer to the SMF/MME.

As further shown in FIG. 1C, and by reference number 155, the NEF/SCEF 120 may receive a notification of expiration of the idle session timer for the low latency application. For example, the SMF/MME may provide the notification of expiration of the idle session timer to the NEF/SCEF 120, and the NEF/SCEF 120 may receive the notification of expiration of the idle session timer.

As further shown in FIG. 1C, and by reference number 160, the NEF/SCEF 120 may provide the notification of expiration of the idle session timer for the low latency application. For example, the NEF/SCEF 120 may provide the notification of expiration of the idle session timer for the low latency application to the low latency application server. The low latency application server may receive the notification of expiration of the idle session timer, and may cause the dedicated bearer session for the low latency application to be released based on expiration of the idle session timer. In some implementations, the application server may provide, to the user device 105, a warning notification indicating that the dedicated bearer session will be released in a time period (e.g., one minute, two minutes, and/or the like) if the user device 105 fails to utilize the low latency application. In such implementations, the low latency application server may cause the dedicated bearer session to be released if the user device 105 fails to utilize the low latency application within the time period.

Figure 1D:
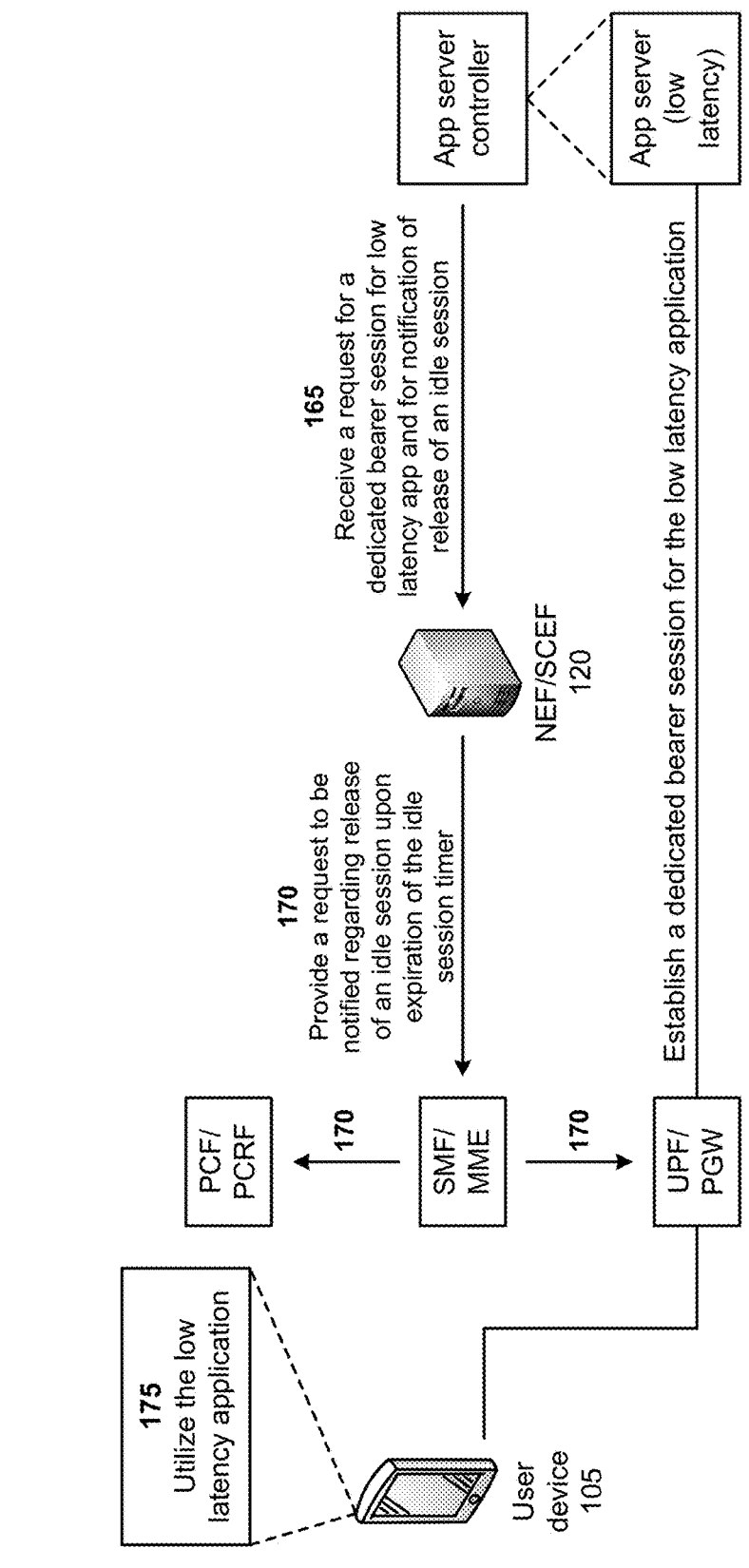

As shown in FIG. 1D, and by reference number 165, the NEF/SCEF 120 may receive a request for a dedicated bearer session for a low latency application and for a notification of release of an idle session. For example, when the user device 105 attempts to establish a dedicated bearer session with the low latency application server (e.g., for accessing the low latency application), the low latency application server may generate the request for the dedicated bearer session for the low latency application. The request for the dedicated bearer session may also include a subscription request for the notification of release of the idle session for the low latency application. The low latency application may provide the request for the dedicated bearer session for the low latency application and for the notification of release of the idle session for the low latency application to the NEF/SCEF 120, and the NEF/SCEF 120 may receive the request for the dedicated bearer session for the low latency application and for the notification of release of the idle session for the low latency application.

As further shown in FIG. 1D, and by reference number 170, the NEF/SCEF 120 may provide a request to be notified regarding release of an idle session upon expiration of the idle session timer for the low latency application. For example, the NEF/SCEF 120 may provide the request to be notified regarding release of the idle session upon expiration of the idle session timer for the low latency application to the SMF/MME, and the SMF/MME may provide the request to be notified regarding release of the idle session upon expiration of the idle session timer for the low latency application to the UPF/PGW and the PCF/PCRF. In some implementations, the request may include a control flag indicating (e.g., if set) that the NEF/SCEF 120 is to be notified regarding release of the idle session upon expiration of the idle session timer for the low latency application. In some implementations, the request may include the request for the dedicated bearer session for the low latency application.

The UPF/PGW may receive the request to be notified regarding release of the idle session upon expiration of the idle session timer for the low latency application (e.g., which includes the request for the dedicated bearer session for the low latency application), and may establish a PDU session with the user device 105, via the RAN 110, so that the user device 105 may access the low latency application server. As further shown in FIG. 1D, the UPF/PGW may establish a low latency QoS dedicated bearer session between the user device 105 and the low latency application server, via the PDU session.

As further shown in FIG. 1D, and by reference number 175, the user device 105 may utilize the low latency application. For example, the user device 105 may utilize the low latency application (e.g., provided by the low latency application server) via the low latency QoS dedicated bearer session established between the user device 105 and the low latency application server. In some implementations, the user device 105 may utilize the low latency application for a brief time period (e.g., in seconds or minutes) after establishment of the low latency QoS dedicated bearer session, a longer time period (e.g., in minutes or hours) after establishment of the low latency QoS dedicated bearer session, and/or the like.

Figure 1E:
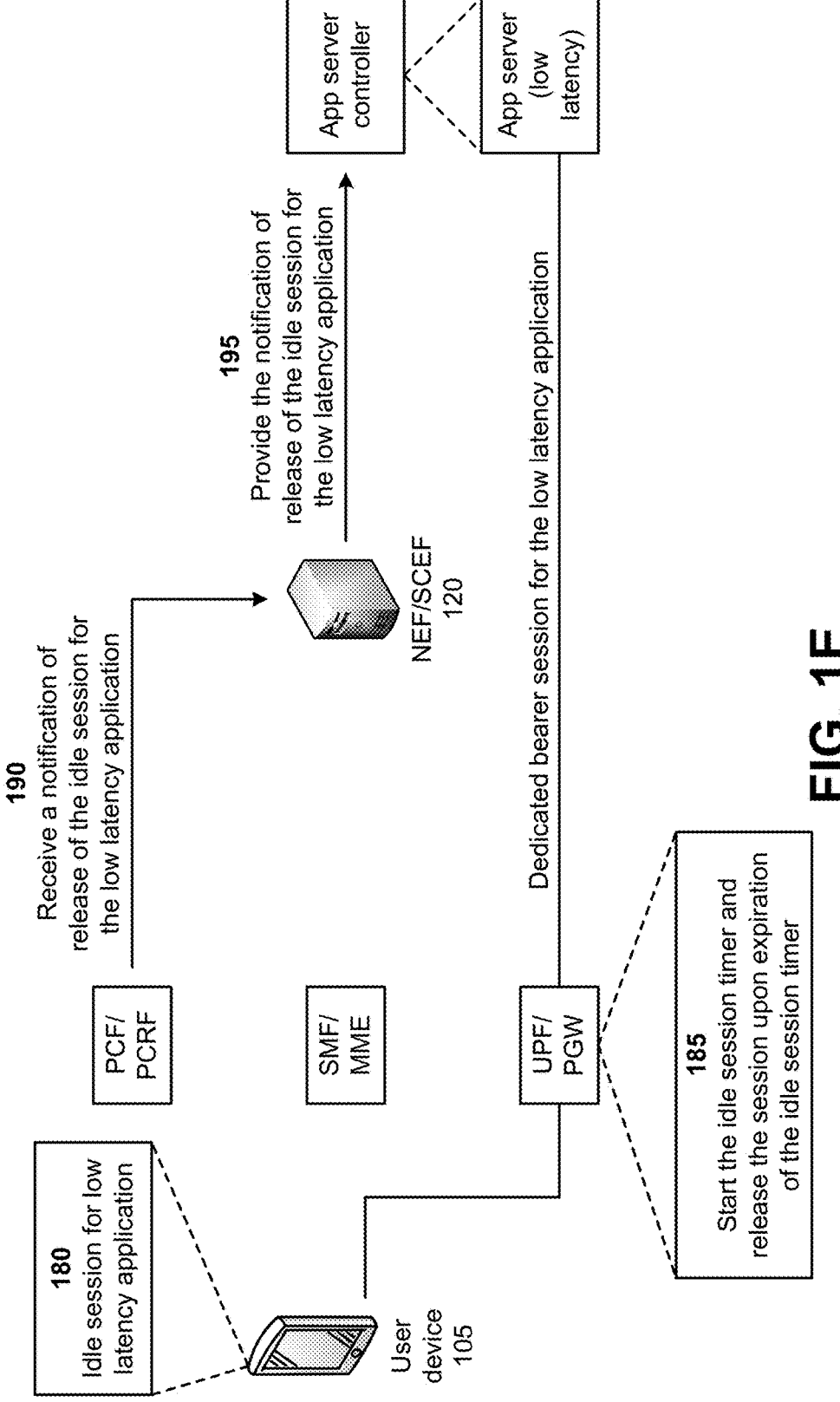

As shown in FIG. 1E, and by reference number 180, the user device 105 may cease utilizing the low latency application to create an idle session for the low latency application. For example, the user device 105 may cease utilizing the low latency application immediately after establishment of the low latency QoS dedicated bearer session, a time period after establishment of the low latency QoS dedicated bearer session, and/or the like. For example, if the low latency application is a video conferencing application, a user of the user device 105 may utilize the video conferencing application for an hour and may then take a break from utilizing the video conferencing application but without exiting the video conferencing application. In such an example, the video conferencing application may create the idle session for the low latency application that is unnecessarily utilizing network resources.

As further shown in FIG. 1E, and by reference number 185, the UPF/PGW may start the idle session timer for the low latency application and may release the session upon expiration of the idle session timer. For example, the UPF/PGW may start the idle session timer for the low latency application when the user device 105 ceases utilizing the low latency application and creates the idle session for the low latency application. The idle session timer may continue until the user device 105 utilizes the low latency application again or until the idle session timer expires. The idle session timer may include a timer set for a predetermined time period (e.g., in minutes and less than one hour). If the user device 105 creates the idle session for the low latency application and fails to utilize the low latency application, the idle session timer may expire. When the idle session timer expires, the UPF/PGW may release the dedicated bearer session for the low latency application and may notify the PCF/PCRF that the dedicated bearer session for the low latency application has been released.

As further shown in FIG. 1E, and by reference number 190, the NEF/SCEF 120 may receive a notification of release of the idle session for the low latency application. For example, when the PCF/PCRF is notified (e.g., by the UPF/PGW) that the dedicated bearer session for the low latency application has been released, the PCF/PCRF may generate the notification of release of the idle session for the low latency application. The PCF/PCRF may provide the notification of release of the idle session for the low latency application to the NEF/SCEF 120, and the NEF/SCEF 120 may receive the notification of release of the idle session for the low latency application.

As further shown in FIG. 1E, and by reference number 195, the NEF/SCEF 120 may provide the notification of release of the idle session for the low latency application. For example, the NEF/SCEF 120 may provide the notification of release of the idle session for the low latency application to the low latency application server. The low latency application server may receive the notification of release of the idle session for the low latency application.

The implementations described above may be provided based on enhancing functionalities of the application servers, the NEF/SCEF 120, the PCF/PCRF, the SMF/MME, and the UPF/PGW. For example, the application servers may be provided an application programming interface (API) enhancement that subscribes to an idle status of a dedicated bearer session and to a reporting procedure that notifies the application servers when the idle session timer expires or when an idle session is released. The NEF/SCEF 120 may be enhanced to provide a local policy for registering an idle status of a dedicated bearer session based on a control flag for the idle status as per a profile provided by an application server. The NEF/SCEF 120 may also be enhanced to provide a signaling procedure that enables an idle status subscription and an option to enable the SMF/MME and/or the UPF/PGW to release an idle session. The NEF/SCEF 120 may be enhanced to provide a signaling procedure to receive an idle session status report that includes a value of the idle session timer.

The PCF/PCRF may be enhanced to provide the notification of release of the idle session for the low latency application to the NEF/SCEF 120. The SMF/MIE may be enhanced to provide a signaling procedure that handles an idle status report subscription and reporting, and to provide an idle session timer-based dedicated bearer release handling if requested by NEF/SCEF 120 or the application server. The SMF/MME may also be enhanced to provide signaling that passes the idle session timer or the notification of release of the idle session. The UPF/PGW may be enhanced to provide dedicated bearer idle detection per subscription (e.g., at a dedicated bearer session level when multiple flows are carried over by the same dedicated bearer), to provide a dedicated bearer idle detection triggered release, and to provide the notification of the release to the SMF/MME, NEF/SCEF 120, and/or the application server.

In this way, the NEF/SCEF 120 provides network-based detection of idle dedicated bearer resources. For example, the NEF/SCEF 120 may monitor activity associated with a low latency application, and may determine whether the low latency application is idle based on monitoring the activity associated with the low latency application. The NEF/SCEF 120 may cause the dedicated bearer resources associated with the low latency application to be released based on determining that the low latency application has been idle for a predetermined period of time. Thus, the NEF/SCEF 120 may conserve computing resources, networking resources, and/or other resources that would otherwise have been consumed by utilizing dedicated bearer resources for an idle or inactive low latency application, failing to identify the idle or inactive low latency application, failing to provide dedicated bearer resources for other low latency applications, creating network congestion due to utilizing dedicated bearer resources for the idle or inactive low latency application, and/or the like.

As indicated above, FIGS. 1A-1E are provided as an example. Other examples may differ from what is described with regard to FIGS. 1A-IE. The number and arrangement of devices shown in FIGS. 1A-IE are provided as an example. In practice, there may be additional devices, fewer devices, different devices, or differently arranged devices than those shown in FIGS. 1A-IE. Furthermore, two or more devices shown in FIGS. 1A-IE may be implemented within a single device, or a single device shown in FIGS. 1A-IE may be implemented as multiple, distributed devices. Additionally, or alternatively, a set of devices (e.g., one or more devices) shown in FIGS. 1A-1E may perform one or more functions described as being performed by another set of devices shown in FIGS. 1A-IE.

Figure 2:
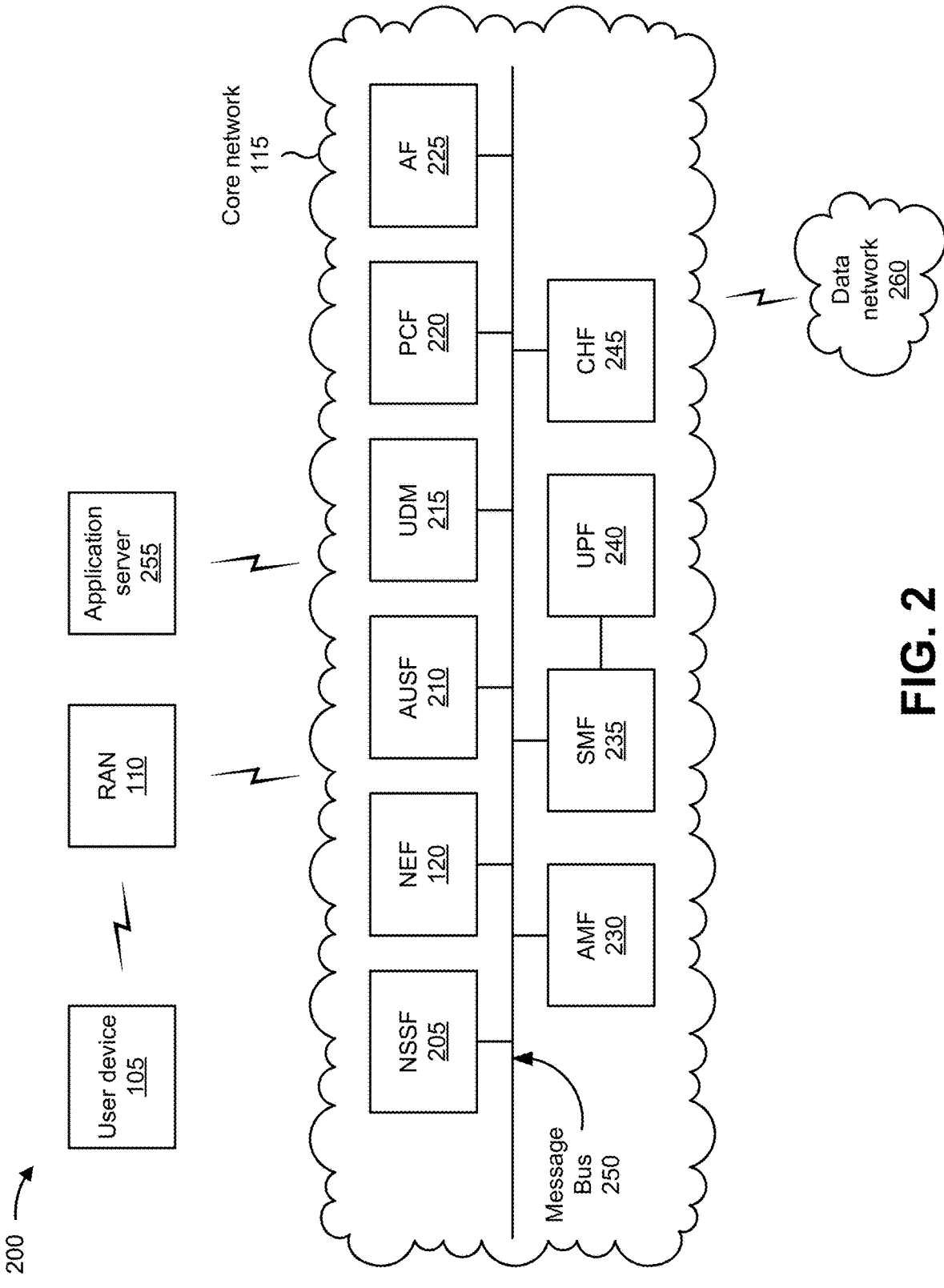
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, an application server 255, and a data network 260. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, the NEF 120, an authentication server function (AUSF) 210, a unified data management (UDM) component 215, a PCF 220, an application function (AF) 225, an access and mobility management function (AMF) 230, an SMF 235, a UPF 240, and/or a charging function (CHF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 120 includes one or more devices that support exposure of capabilities and/or events in the wireless telecommunications system to help other entities in the wireless telecommunications system discover network services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to the NEF 120, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The CHF 245 includes one or more devices that design, model, build, configure, and implement subscriber, network, and application charging and rating plans in real time. The CHF 245 may support online and offline charging feature for multiple services, including 5G and 4G core integration.

The message bus 250 represents a communication structure for communication among the functional elements. In other words, the message bus 250 may permit communication between two or more functional elements.

The application server 255 includes one or more devices capable of receiving, generating, storing, processing, providing, and/or routing information, as described elsewhere herein. The application server 255 may include a communication device and/or a computing device. For example, the application server 255 may include a server, such as an application server, a client server, a web server, a database server, a host server, a proxy server, a virtual server (e.g., executing on computing hardware), or a server in a cloud computing system. In some implementations, the application server 255 includes computing hardware used in a cloud computing environment.

The data network 260 includes one or more wired and/or wireless data networks. For example, the data network 260 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
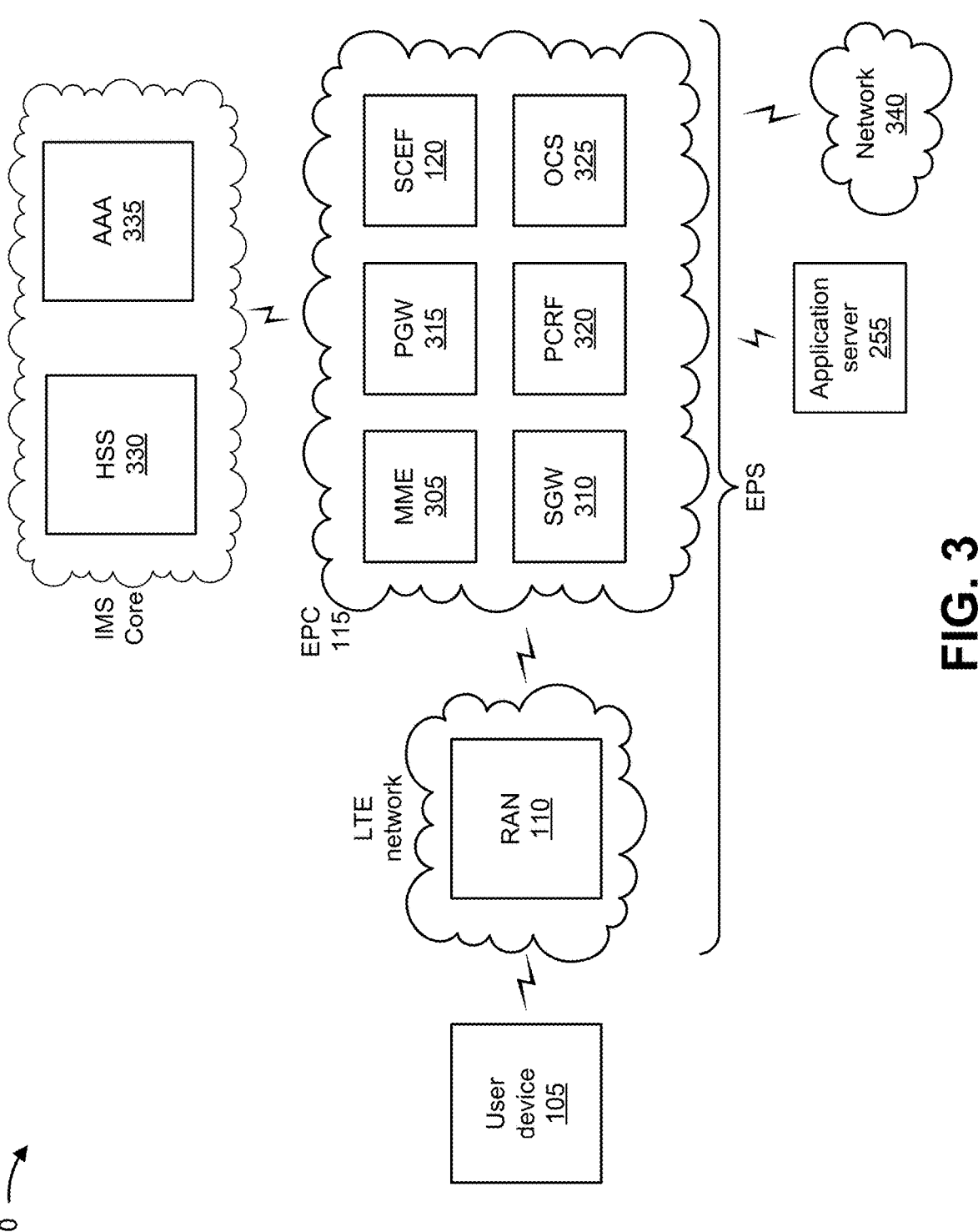

FIG. 3 is a diagram of an example environment 300 in which systems and/or methods, described herein, may be implemented. As shown in FIG. 3, the environment 300 may include the user device 105, the RAN 110, the core network 115, and the application server 255. The user device 105, the RAN 110, and the application server 255 are described elsewhere herein. The core network 115 may include an SCEF 120, an MME 305, a serving gateway (SGW) 310, a PGW 315, a PCRF 320, an OCS 325, a home subscriber server (HSS) 330, an authentication, authorization, and accounting server (AAA) 335, and a network 340. Devices of the environment 300 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a 5G network.

The environment 300 may include an evolved packet system (EPS) that includes an LTE network and/or an evolved packet core (EPC) (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the SCEF 120, the MME 305, the SGW 310, the PGW 315, the PCRF 320, and/or the OCS 325 to enable the user device 105 to communicate with the network 340 and/or an Internet protocol (IP) multimedia subsystem (IMS) core. The IMS core may include the HSS 330 and/or the AAA 335, and may manage device registration and authentication, session initiation, and/or other operations associated with user devices 105. The HSS 330 and/or the AAA 335 may reside in the EPC 115 and/or the IMS core.

The SCEF 120 includes one or more devices, such as one or more server devices, capable of providing interfaces for data transfers and control messaging between enterprises and the core network 115. The SCEF 120 may provide application programming interfaces (APIs) to the enterprises for the data transfers and control messages, and may utilize 3GPP-defined interfaces with network elements in the core network 115 when performing functions.

The MME 305 includes one or more devices, such as one or more server devices, capable of managing authentication, activation, deactivation, and/or mobility functions associated with the user device 105. In some implementations, the MME 305 may perform operations relating to authentication of the user device 105. Additionally, or alternatively, the MME 305 may facilitate the selection of a particular SGW 310 and/or a particular PGW 315 to provide traffic to and/or from the user device 105. The MME 305 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 305 may select another MME (not pictured), to which the user device 105 should be handed off (e.g., when the user device 105 moves out of range of the MME 305).

The SGW 310 includes one or more devices capable of routing packets. For example, the SGW 310 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, the SGW 310 may aggregate traffic received from one or more RANs 110 associated with the LTE network, and may send the aggregated traffic to the network 340 (e.g., via the PGW 315) and/or other network devices associated with the EPC 115 and/or the IMS core. The SGW 310 may receive traffic from the network 340 and/or other network devices, and may send the received traffic to the user device 105 via the RAN 110. Additionally, or alternatively, the SGW 310 may perform operations associated with handing off the user device 105 to and/or from an LTE network.

The PGW 315 includes one or more devices capable of providing connectivity for the user device 105 to external packet data networks (e.g., other than the depicted EPC 115 and/or the LTE network). For example, the PGW 315 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the PGW 315 may aggregate traffic received from one or more SGWs 310, and may send the aggregated traffic to the network 340. Additionally, or alternatively, the PGW 315 may receive traffic from the network 340, and may send the traffic to the user device 105 via the SGW 310 and the RAN 110. The PGW 315 may record data usage information (e.g., byte usage), and may provide the data usage information to the AAA 335.

The PCRF 320 includes one or more devices, such as one or more server devices, capable of providing policy control decision and flow-based charging control functionalities. For example, the PCRF 320 may provide network control regarding service data flow detection, gating, and/or quality of service (QoS) and flow-based charging, among other examples. In some implementations, the PCRF 320 may determine how a certain service data flow is to be treated, and may ensure that user plane traffic mapping and treatment is in accordance with a user subscription profile.

The OCS 325 includes one or more devices, such as one or more server devices, that enable a cellular network service provider to charge customers (e.g., user devices 105), in real time, based on service usage.

The HSS 330 includes one or more devices, such as one or more server devices, capable of managing (e.g., receiving, generating, storing, processing, and/or providing) information associated with the user device 105. For example, the HSS 330 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 330 may provide this information to one or more other devices of the environment 300 to support the operations performed by those devices.

The AAA 335 includes one or more devices, such as one or more server devices, that perform authentication, authorization, and/or accounting operations for communication sessions associated with the user device 105. For example, the AAA 335 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 340 includes one or more wired and/or wireless networks. For example, the network 340 may include a cellular network (e.g., a 5G network, an LTE network, a 3G network, a code division multiple access (CDMA) network, etc.), a PLMN, a LAN, a WAN, a MAN, a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
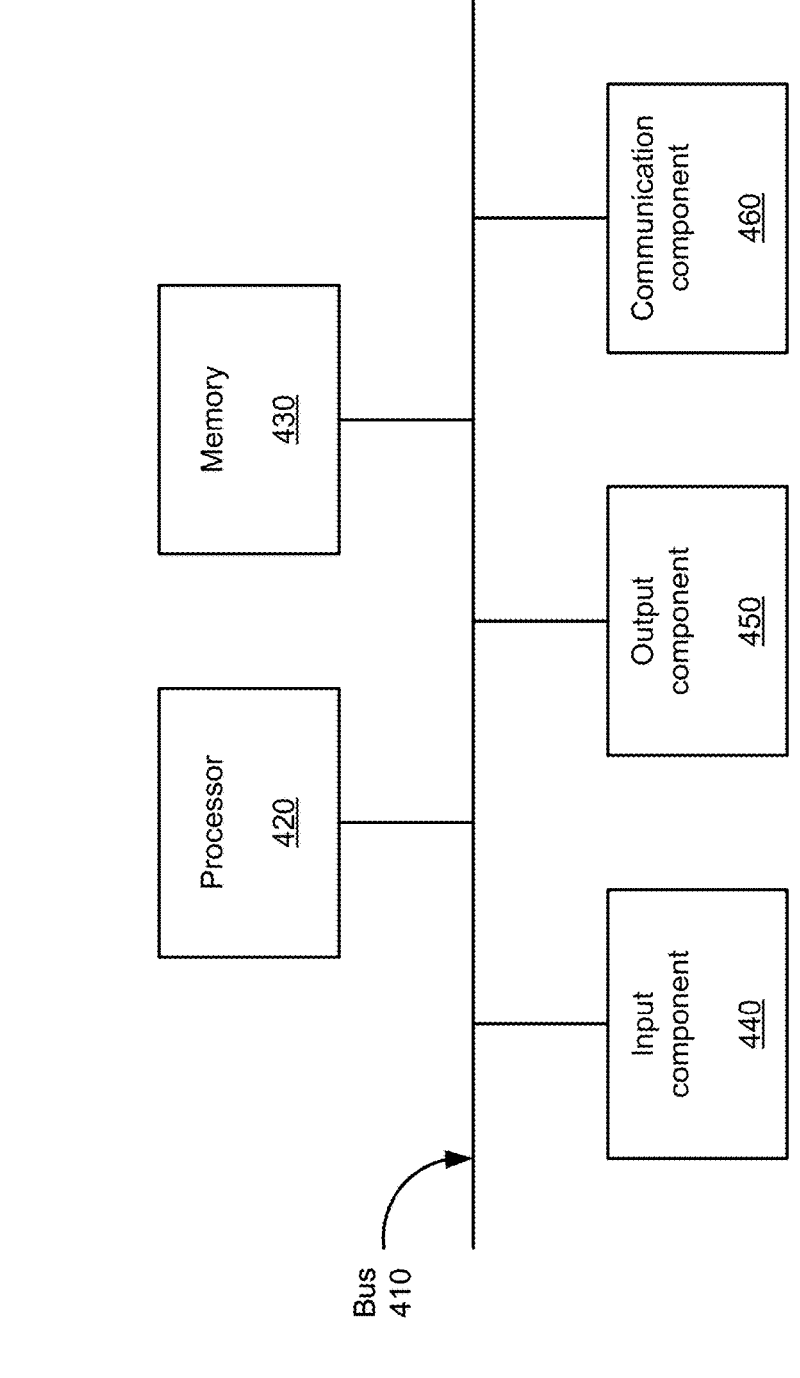
FIG. 4 is a diagram of example components of one or more devices of FIGS. 2 and 3.

FIG. 4 is a diagram of example components of a device 400, which may correspond to the user device 105, the RAN 110, the NEF/SCEF 120, the NSSF 205, the AUSF 210, the UDM 215, the PCF 220, the AF 225, the AMF 230, the SMF 235, the UPF 240, the CHF 245, the application server 255, the MME 305, the SGW 310, the PGW 315, the PCRF 320, the OCS 325, the HSS 330, and/or the AAA 335. In some implementations, the user device 105, the RAN 110, the NEF/SCEF 120, the NSSF 205, the AUSF 210, the UDM 215, the PCF 220, the AF 225, the AMF 230, the SMF 235, the UPF 240, the CHF 245, the application server 255, the MME 305, the SGW 310, the PGW 315, the PCRF 320, the OCS 325, the HSS 330, and/or the AAA 335 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for network-based detection of idle dedicated bearer resources. In some implementations, one or more process blocks of FIG. 5 may be performed by a first network device (e.g., the NEF/SCEF 120). In some implementations, one or more process blocks of FIG. 5 may be performed by another device or a group of devices separate from or including the first network device, such as a PCF/PCRF (e.g., the PCF 220 or the PCRF 320) and/or a UPF/PGW (e.g., the UPF 240 or the PGW 315). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving, from a first application server, a first request for a first dedicated bearer session for a first application with a first QoS and for a notification of a first idle session for the first application (block 510). For example, the first network device may receive, from a first application server, a first request for a first dedicated bearer session for a first application with a first QoS and for a notification of a first idle session for the first application, as described above. In some implementations, the first network device is one of a network exposure function or a service capabilities exposure function.

As further shown in FIG. 5, process 500 may include generating, based on the first request, a second request to be notified regarding expiration of a first idle session timer for the first application (block 520). For example, the first network device may generate, based on the first request, a second request to be notified regarding expiration of a first idle session timer for the first application, as described above.

As further shown in FIG. 5, process 500 may include providing the second request to a second network device (block 530). For example, the first network device may provide the second request to a second network device, as described above. In some implementations, the second request causes the second network device to start the first idle session timer for the first application when the first idle session is created for the first application. In some implementations, the second network device is one or more of a policy control function, a policy and charging rules function, a session management function, a mobility management entity, a user plane function, or a packet data network gateway. In some implementations, the first network device is a network exposure function and the second network device is a session management function. In some implementations, the first network device is a service capabilities exposure function and the second network device is a mobility management entity.

As further shown in FIG. 5, process 500 may include receiving, from the second network device and based on the second request, a notification of expiration of the first idle session timer for the first application (block 540). For example, the first network device may receive, from the second network device and based on the second request, a notification of expiration of the first idle session timer for the first application, as described above.

As further shown in FIG. 5, process 500 may include providing, to the first application server, the notification of expiration of the first idle session timer for the first application (block 550). For example, the first network device may provide, to the first application server, the notification of expiration of the first idle session timer for the first application, as described above. In some implementations, the notification of expiration of the first idle session timer for the first application causes the first application server to release the first dedicated bearer session for a first application. In some implementations, the notification of expiration of the first idle session timer for the first application includes a value of the first idle session timer.

In some implementations, process 500 includes causing the first dedicated bearer session to be established for a user device based on the first request, wherein the user device is capable of utilizing the first application via the first dedicated bearer session and ceasing utilization of the first application to create the first idle session for the first application.

In some implementations, process 500 includes receiving, from a second application server, a third request for a second dedicated bearer session for a second application with a second QoS and for a notification of release of a second idle session; generating, based on the third request, a fourth request to be notified regarding the release of the second idle session upon expiration of a second idle session timer for the second application; providing the fourth request to the second network device; receiving, from the second network device and based on the fourth request, a notification of release of the second idle session for the second application; and providing, by the first network device and to the second application server, the notification of release of the second idle session for the second application.

In some implementations, the fourth request causes the second network device to release the second dedicated bearer session upon expiration of the second idle session timer. In some implementations, process 500 includes causing the second dedicated bearer session to be established for a user device based on the third request, wherein the user device is capable of utilizing the second application via the second dedicated bearer session and ceasing utilization of the second application to create the second idle session for the second application. In some implementations, the fourth request causes the second network device to start the second idle session timer for the second application when the second idle session is created for the second application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a first network device and from a first application server, a first request for a first dedicated bearer session for a first application with a first quality of service (QoS) and for a notification of a first idle session for the first application;

generating, by the first network device and based on the first request, a second request to be notified regarding expiration of a first idle session timer for the first application;

providing, by the first network device, the second request to a second network device;

receiving, by the first network device, from the second network device, and based on the second request, a notification of expiration of the first idle session timer for the first application;

providing, by the first network device and to the first application server, the notification of expiration of the first idle session timer for the first application;

receiving, by the first network device and from a second application server, a third request for a second dedicated bearer session for a second application with a second QoS and for a notification of release of a second idle session;

generating, by the first network device and based on the third request, a fourth request to be notified regarding the release of the second idle session upon expiration of a second idle session timer for the second application;

providing, by the first network device, the fourth request to the second network device;

receiving, by the first network device, from the second network device, and based on the fourth request, a notification of release of the second idle session for the second application; and providing, by the first network device and to the second application server, the notification of release of the second idle session for the second application.

2. The method of claim 1, further comprising:

causing the first dedicated bearer session to be established for a user device based on the first request, wherein the user device is capable of utilizing the first application via the first dedicated bearer session and ceasing utilization of the first application to create the first idle session for the first application.

3. The method of claim 1, wherein the second request causes the second network device to start the first idle session timer for the first application when the first idle session is created for the first application.

4. The method of claim 1, wherein the fourth request causes the second network device to release the second dedicated bearer session upon expiration of the second idle session timer.

5. The method of claim 1, further comprising:

causing the second dedicated bearer session to be established for a user device based on the third request, wherein the user device is capable of utilizing the second application via the second dedicated bearer session and ceasing utilization of the second application to create the second idle session for the second application.

6. The method of claim 5, wherein the fourth request causes the second network device to start the second idle session timer for the second application when the second idle session is created for the second application.

7. The method of claim 1, wherein the first request includes a subscription by the first application server to idle session status for the first dedicated bearer session, via an application programming interface.

8. A first network device, comprising:

one or more processors configured to:

receive, from a first application server, a first request for a first dedicated bearer session for a first application with a first quality of service (QoS) and for a notification of a first idle session for the first application;

generate, based on the first request, a second request to be notified regarding expiration of a first idle session timer for the first application;

provide the second request to a second network device to cause the second network device to start the first idle session timer for the first application when the first idle session is created for the first application;

receive, from the second network device, and based on the second request, a notification of expiration of the first idle session timer for the first application;

provide, to the first application server, the notification of expiration of the first idle session timer for the first application;

receive, from a second application server, a third request for a second dedicated bearer session for a second application with a second QoS and for a notification of release of a second idle session;

generate, based on the third request, a fourth request to be notified regarding the release of the second idle session upon expiration of a second idle session timer for the second application;

provide the fourth request to the second network device;

receive, from the second network device and based on the fourth request, a notification of release of the second idle session for the second application; and provide, to the second application server, the notification of release of the second idle session for the second application.

9. The first network device of claim 8, wherein the second network device is one or more of:

a policy control function, a policy and charging rules function, a session management function, a mobility management entity, a user plane function, or a packet data network gateway.

10. The first network device of claim 8, wherein the first network device is one of a network exposure function or a service capabilities exposure function.

11. The first network device of claim 8, wherein the notification of expiration of the first idle session timer for the first application causes the first application server to release the first dedicated bearer session for a first application.

12. The first network device of claim 8, wherein the notification of expiration of the first idle session timer for the first application includes a value of the first idle session timer.

13. The first network device of claim 8, wherein the first network device is a network exposure function and the second network device is a session management function.

14. The first network device of claim 8, wherein the first network device is a service capabilities exposure function and the second network device is a mobility management entity.

15. A non-transitory computer-readable medium storing a set of instructions, the set of instructions comprising:

one or more instructions that, when executed by one or more processors of a first network device, cause the first network device to:

receive, from a first application server, a first request for a first dedicated bearer session for a first application with a first quality of service (QoS) and for a notification of a first idle session for the first application;

cause the first dedicated bearer session to be established for a user device based on the first request, wherein the user device is capable of utilizing the first application via the first dedicated bearer session and ceasing utilization of the first application to create the first idle session for the first application;

generate, based on the first request, a second request to be notified regarding expiration of a first idle session timer for the first application;

provide the second request to a second network device;

receive from the second network device, and based on the second request, a notification of expiration of the first idle session timer for the first application;

provide, to the first application server, the notification of expiration of the first idle session timer for the first application;

receive, from a second application server, a third request for a second dedicated bearer session for a second application with a second QoS and for a notification of release of a second idle session;

generate, based on the third request, a fourth request to be notified regarding the release of the second idle session upon expiration of a second idle session timer for the second application;

provide the fourth request to the second network device;

receive, from the second network device and based on the fourth request, a notification of release of the second idle session for the second application; and provide, to the second application server, the notification of release of the second idle session for the second application.

16. The non-transitory computer-readable medium of claim 15, wherein the fourth request causes the second network device to release the second dedicated bearer session upon expiration of the second idle session timer.

17. The non-transitory computer-readable medium of claim 15, wherein the one or more instructions further cause the first network device to:

cause the second dedicated bearer session to be established for the user device based on the third request, wherein the user device is capable of utilizing the second application via the second dedicated bearer session and ceasing utilization of the second application to create the second idle session for the second application.

18. The non-transitory computer-readable medium of claim 17, wherein the fourth request causes the second network device to start the second idle session timer for the second application when the second idle session is created for the second application.

19. The non-transitory computer-readable medium of claim 15, wherein the notification of expiration of the first idle session timer for the first application causes the first application server to release the first dedicated bearer session for a first application.

20. The non-transitory computer-readable medium of claim 15, wherein the first request includes a subscription to idle session status for the first dedicated bearer session.

* * * * *